UNITED STATES PATENT OFFICE.

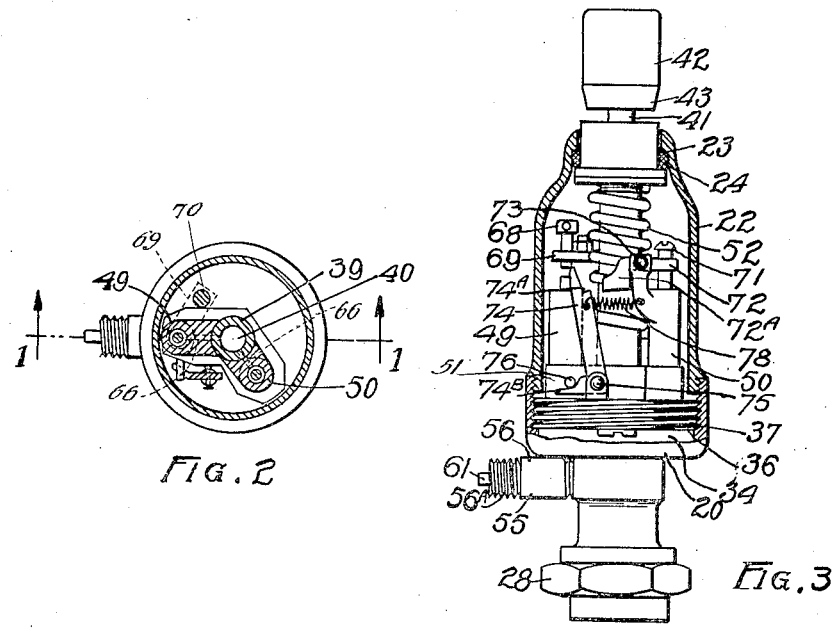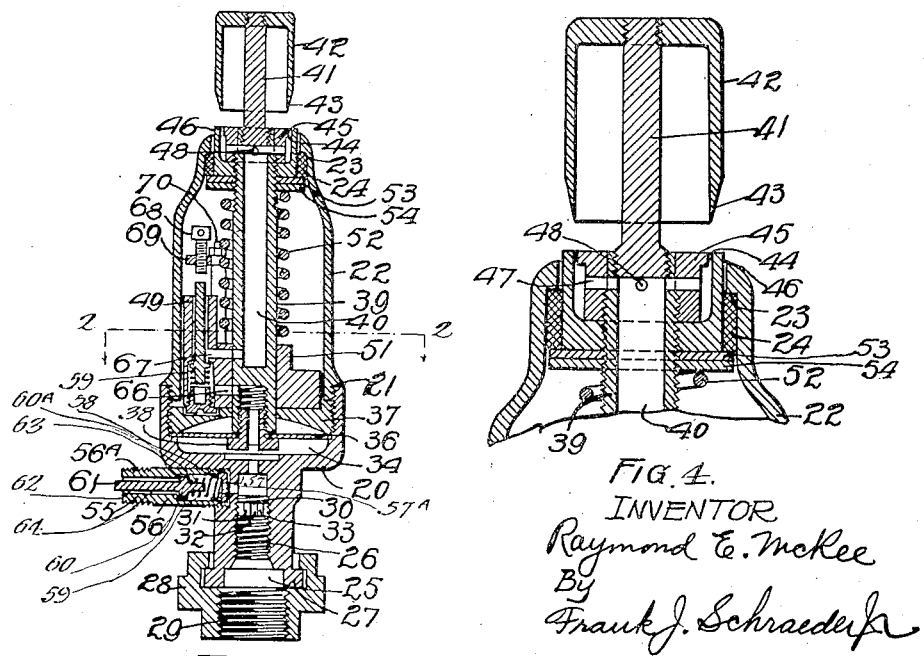

RAYMOND E. McKEE, OF CHICAGO, ILLINOIS.

SAFETY-VALVE MECHANISM AND PRESSURE-SIGNAL.

1,359,262.  Specification of Letters Patent.  Patented Nov. 16, 1920.

Application filed August 1, 1917. Serial No. 183,986.

*To all whom it may concern:*

Be it known that I, RAYMOND E. McKEE, a citizen of the United States, residing at Chicago, in the county of Cook and State of Illinois, have invented certain new and useful Improvements in a Combined Safety-Valve Mechanism and Pressure-Signal, of which the following is a specification.

This invention relates to safety-valves and more particularly to safety-valves and pressure signals for pneumatic tires and the like, and has among its objects the production of a combined safety-valve and high and low pressure signal which will prolong the life of pneumatic tires and prevent what is commonly termed, "blow-outs".

Two principal causes underlie the blowing up of pneumatic tires: first, under-inflation, and second, over-inflation.

When an automobile is run with tires underinflated the sides of the tire are subjected to a greater bending motion, which has a tendency of gradually weakening and breaking the fibers in the material and thereby producing a weakened tire which easily bursts when the air pressure is increased therein.

Also, an over-inflated tire may burst when the air in the tire is sufficiently heated to an excessive air pressure for a weakened portion in the tire.

The principal object of this invention resides in the provision of a safety-valve and signal for pneumatic tires which will automatically signal and exhaust or relieve the pressure in the tire when the pressure has been raised above a pre-determined point, and which will also signal and warn the operator or driver of an automobile when the pressure in any tire is lowered below a certain desired low pressure. Such high and low pressure signal comprises a whistle alarm.

With the above and other objects in view, the invention consists in the details of construction and in the arrangement and combination of parts hereinafter described and particularly pointed out in the appended claims.

In describing the invention in detail, reference will be had to the accompanying drawings, wherein like reference characters denote corresponding parts in the several views, and in which—

Figure 1 is a part vertical section of my invention taken on line 1—1 of Fig. 2.

Fig. 2 is a cross-section taken on line 2—2 of Fig. 1.

Fig. 3 is a part section showing an elevation of the interior mechanism.

Fig. 4 illustrates an enlarged detail of the whistle signal.

Referring to the drawings, my device consists of a lower body member 20 having a threaded connection 21 with a cylindrical wall member 22 which latter has a converging top formed with the interior shoulder 23 to retain the soft oil packing 24. The lower body member 20 is provided with a central bore 25 which has a portion decreased in diameter as at 26 to fit over the exterior of the threaded end of a standard pneumatic tire valve tube, the construction of which is well understood in the art.

A loosely mounted nut 28, internally threaded at 29, is provided over the external collar 27 which is formed at lower part of the valve body 20. It is evident, that by the use of this construction, the entire device can be mounted in a certain fixed relative position to the wheel.

Within the internally threaded bore 26 is a vertically adjustable disk 30, the lower face 31 of which has a central projection 32 adapted to depress the tire valve stem to maintain the valve in open position for communication with the interior of the diaphragm chamber 34 through several holes 33, which are drilled in the disk 30. Therefore, as long as my device is attached to the tire tube, there will be constant communication between the interior of the diaphragm chamber 34 and the interior of the pneumatic tire.

The diaphragm 36 made preferably of hardened brass, is securely retained by the threaded disk 37 which is dished on the lower face to allow for movement of the diaphragm.

Centrally connected with said diaphragm 36, by means of the screw 38, is a vertically movable, tubular member 39 provided with an interior bore 40 with the upper portion interiorly threaded and supporting the whistle stem 41 and whistle hood 42, the thin edge 43 of which is situated directly above the circumferential space 44 between the sleeve 45 and the cup-like outer member 46. A plurality of horizontal openings 47 register with the openings 48 within the upper portion of the stem 39 and admit the passage of a current of air through same and the space 44 against the thin edge 43 of the whistle to sound the alarm. The screw 38 is provided with a longitudinal bore to afford constant communication between the interior of the pneumatic tire and a pair of valves 49 and 50 which control the passage of air into the interior bore 40 of the member 39.

An enlarged cast base member 51 is made rigid with the tubular member 39 and forms a seat for a coiled spring 52, the upper end of which abuts against the adjusting washers 53 and 54 which may be one or more in number depending on the compression desired.

The spring pressure adjusting washers 53 and 54 are made to fit loosely over the tubular member 39.

When my device is in use in connection with an automobile tire, the same is provided with an air inlet valve 55 communicating with the bore 26. This inlet valve as indicated in Figs. 1, 2 and 3 comprises a casing 56 threaded exteriorly at both ends and also interiorly at the valve connection end for the spring-retaining plug 57 which is provided with the air passage 57$^A$ and a cavity 58 for retaining one end of the spring 59 while the other end of said spring is in constant abutment with the projecting portion 60$^A$ of the valve 60. The stem 61 has slidable movement within the bore 62. The valve seat 63 is formed of a slightly raised annular portion and is adapted to fit, when in closed position, into the depressed portion 64 of the valve 60, which depression 64 retains a small washer of durable elastic packing material as an air-tight seal.

It is obvious that the spring 59 will constantly tend to close the valve and that the connection of an air-tire supply hose to the threaded end 56$^A$ will in the well known manner depress the stem 61 against the pressure of spring 59 to open the valve.

It will be observed that these signal valves 49 and 50 are movable with the tubular member 39 and that a maximum high pressure can be maintained and regulated and varied by the vertical movement of the adustable screw abutment 68 which is supported on the stationary bracket 69, which bracket is carried on the stationary post 70 and which abutment 68 will contact with the stem of the upwardly moving valve 49 to open and exhaust same at a predetermined high pressure to sound the whistle alarm. Immediately on the lowering of the pressure due to this automatic exhaust the entire tubular member and valve 44 will be lowered away from the contacting abutment 68 and permit the valve 49 to automatically close and thereby always maintain the desired maximum high pressure.

The low pressure signal valve 50, the construction of which is identical with the valve 49, performs the function of admitting air into the movable member 39 to sound the whistle alarm at a predetermined minimum low pressure. The desirable minimum low pressure can also be varied by means of the adjustable screw abutment 71 carried at one end of the operating lever 72 which is pivoted at 73 and which normally has the other end 72$^A$ resting in the notched portion 74$^A$ of the release arm 74 which is pivotally mounted on the support 75 and which support is carried on the stationary disk 37.

A projecting pin 76 rigid with the base 51 is adapted to engage the angularly disposed end 74$^B$ of the release arm 74 at the decrease of pressure and thereby move the arm 74 slowly to the left to a position indicated in Fig. 3 and during such movement, the notched portion 74$^A$ describes an arc and therefore slightly raises the end 72$^A$ of the operating lever 72 sufficiently to move the screw abutment 71 downwardly into engagement with the stem of valve 50 to open same and sound the whistle alarm. It will be noted that this low pressure alarm does not continue indefinitely but is limited in time, for when the release arm 74 has assumed the position indicated in Fig. 3, the end 72$^A$ of the operating lever 72 is freed and allows the valve 50 to close automatically at the action of the air pressure and the spring.

The spring 78, or its equivalent, tends to return the lever 74 into normal position with the notched portion 74$^A$ under the operating lever 72.

In operation, the fluctuation of the pressure of the air within the tire will raise and lower the member 39 with the high pressure valve 49 and the low pressure valve 50 in such manner that when the pressure would exceed the predetermined desirable pressure, the stem of the valve 49 will obviously come into contact with the abutment screw 68 whereby continued upward movement of the member 39 and the valve 49 will cause a downward movement of the stem of valve 49 against the pressure of the spring 59 to open the valve and permit the escape of air through the passage 67 into the bore 40 and thence through the openings 47 and 48, whereby the whistle alarm will be sounded. Should the air pressure decrease for any reason, the member 39 and the valves 49 and 50 will, of course, be lowered and the end 72$^A$ of lever 72 will engage the notched portion 74$^A$ of the pivoted lever 74 in such manner that the continued downward movement of the member 39 and the adjacently mounted valve 50 will cause a downward movement of the end of the lever 72 directly over the stem of the valve 50. It is obvious that the downward movement of the stem of valve 50 will open such valve to allow the escape of the air through a passage 66, also communicating with the bore 40.

Should the pressure continue to further decrease, the projecting pin 76, which is rigid with the base 51, will engage the end 74$^B$ of the arm 74 and thus move the arm 74 away from under the end 72$^A$ of the lever 72 whereby the lever 72 will be released to permit the upward movement of the stem of valve 50 to close the valve and thus prevent further escape of air which otherwise would be continued during the decrease in pressure.

I claim:—

1. In a valve mechanism of the kind described, the combination of a valve body, a spring influenced tubular member movably mounted in said body, a whistle signal communicating with said tubular member, a high pressure valve communicating with said tubular member and signal, a flexible diaphragm having its center in engagement with said tubular member and adapted to be raised and lowered by the fluctuation of the pressure, a low pressure valve communicating with said member and signal, and independent means for operating said valves at predetermined high and low pressures, said means for operating the low pressure valve arranged to limit the duration of the low pressure signal.

2. In a valve mechanism of the kind described, the combination of a valve body, a spring influenced movable member, a diaphragm having its central portion engaging said member and adapted to be raised and lowered by the fluctuation of the pressure beneath it, a whistle signal communicating with the interior of said member, a pair of high and low pressure valves controlling the passage of air from beneath said diaphragm to said signal and independent means for operating said valves at predetermined high and low pressures, said means for operating the low pressure valve arranged to limit the duration of the low pressure signal.

3. In a mechanism of the kind described, the combination of a valve body, a spring-influenced member adapted to move under the fluctuation of air pressure, a whistle signal, a pair of high and low pressure valves communicating with said signal and independent means for operating said valves at predetermined high and low pressures, said means for operating the low pressure valve arranged to limit the duration of the low pressure signal and permit the automatic closing of the said valve.

In witness whereof, I have hereunto subscribed by name this 30th day of July, 1917.

RAYMOND E. McKEE.